United States Patent [19]
Cross et al.

[11] Patent Number: 5,184,833
[45] Date of Patent: Feb. 9, 1993

[54] POWER CHUCK

[75] Inventors: Kenneth Cross, 53793 Sherwood La., Utica, Mich. 48087; Ralph J. Gonnocci, 1130 Cobridge Dr., Rochester Hills, Mich. 48306

[73] Assignees: Kenneth Cross, Utica; Ralph J. Gonnocci, Rochester Hills, both of Mich.

[21] Appl. No.: 816,175

[22] Filed: Jan. 2, 1992

[51] Int. Cl.⁵ .......................................... B23B 31/175
[52] U.S. Cl. .................................. 279/106; 279/119; 279/121; 279/124; 279/132
[58] Field of Search ............... 279/106, 109, 121, 123, 279/124, 107, 108, 119, 132, 157

[56] References Cited

U.S. PATENT DOCUMENTS

| | | | |
|---|---|---|---|
| 2,613,943 | 10/1952 | Trudeau | 279/106 |
| 2,722,427 | 11/1955 | Labeyrie | 279/119 |
| 3,069,181 | 12/1962 | Hohwart et al. | 279/106 |
| 3,131,948 | 5/1964 | Buck | 279/106 |
| 3,233,908 | 2/1966 | Schwarzmayr et al. | 279/107 X |
| 3,267,580 | 8/1966 | Hohwart et al. | 33/178 |
| 3,365,206 | 1/1968 | Hohwart et al. | 279/106 |
| 3,423,098 | 1/1969 | Hohwart et al. | 279/109 |
| 3,472,526 | 10/1969 | Hohwart | 279/106 |
| 3,604,717 | 9/1971 | Hohwart | 279/106 X |
| 4,215,605 | 8/1980 | Toth et al. | 279/106 X |
| 4,465,289 | 8/1984 | Banks | 279/121 |
| 4,569,530 | 2/1986 | Cross | 279/121 X |
| 4,679,802 | 7/1987 | Beal | 279/106 |

*Primary Examiner*—Steven C. Bishop
*Attorney, Agent, or Firm*—Daniel H. Bliss

[57] ABSTRACT

A power chuck includes a body, a plurality of work engaging jaws, a plurality of rocker arms carrying the jaws, and a plurality of swivel mountings connecting the rocker arms to the body. The power chuck also includes a plurality of slide members connected to and matingly engaging the rocker arms and a reciprocable actuator disposed centrally of the rocker arms and operatively cooperating with the slide members. Reciprocatory movement of the actuator along the slide members rocks the rocker arms in the swivel mountings and moves the jaws radially relative to each other.

20 Claims, 3 Drawing Sheets

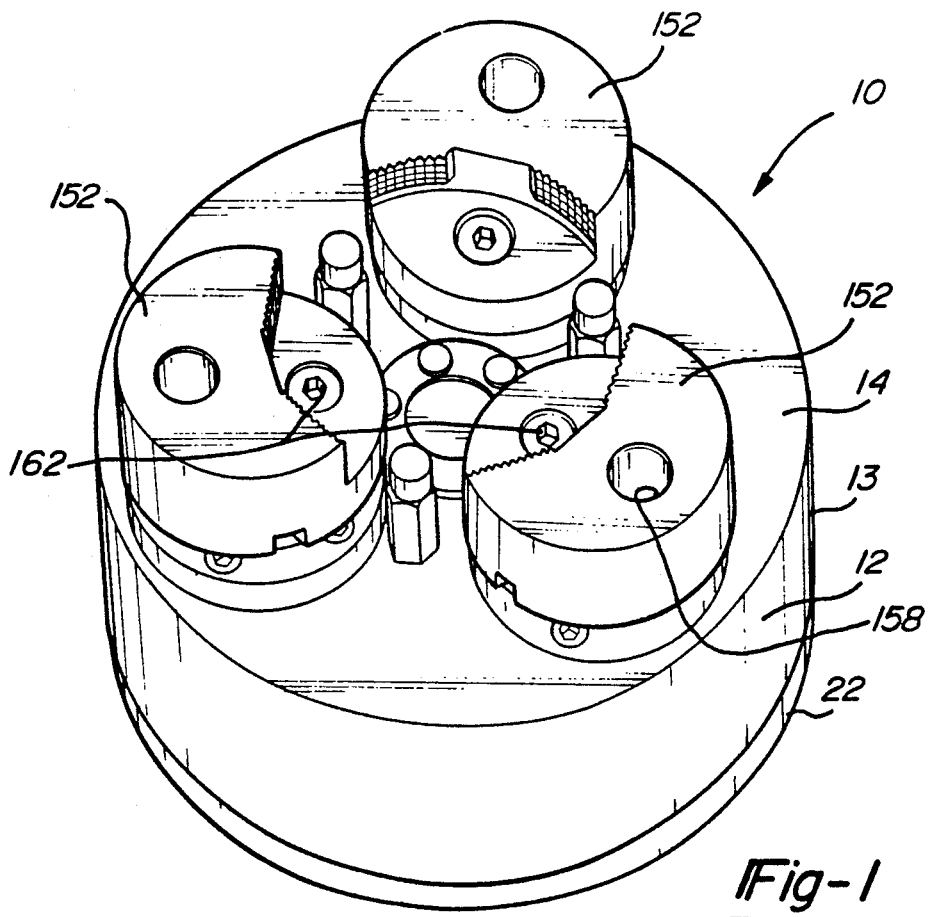
Fig-1
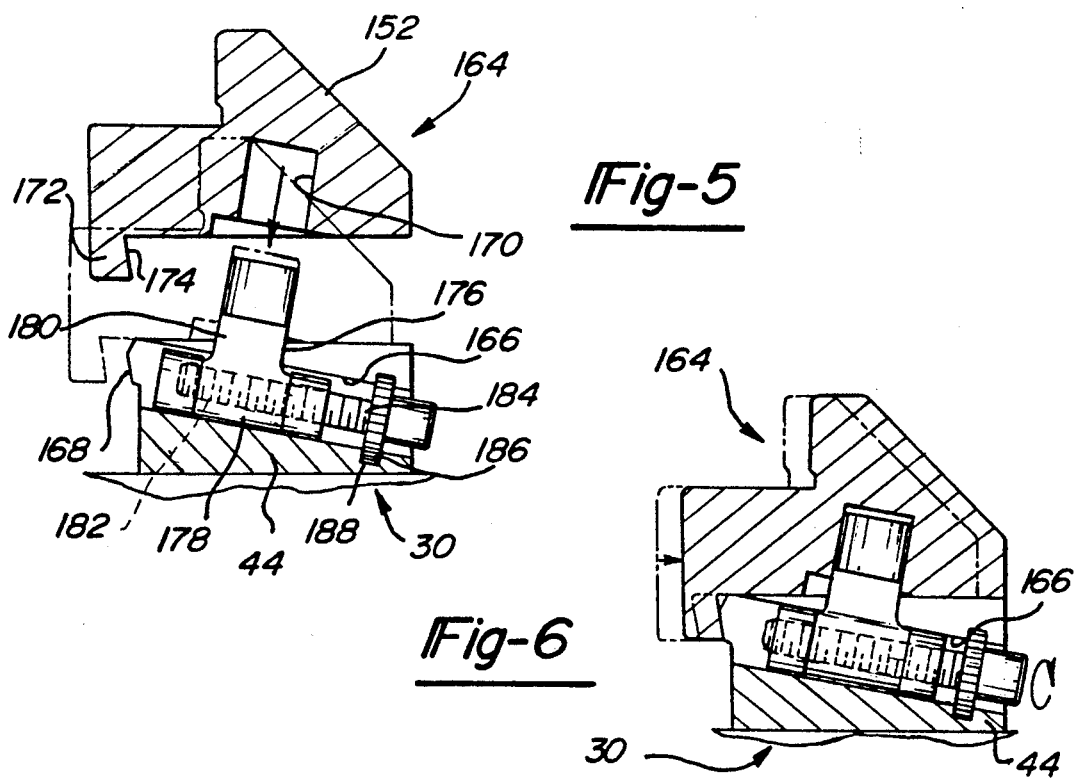
Fig-5
Fig-6

POWER CHUCK

BACKGROUND OF THE INVENTION

1. Field of the Invention

The present invention relates generally to power chucks, and more particularly to, a power chuck providing a substantially constant power ratio.

2. Description of the Related Art

Generally, power chucks are used to hold a workpiece. Typically, these power chucks are mounted on a rotatable spindle of a machine tool. Commonly, the power chuck has a body and an axially disposed actuator mounted for reciprocation therein. The power chuck also has a plurality of axially extending rocker arms with work engaging jaws spaced radially equidistantly around the actuator and mounted for rocking movement to engage and disengage the workpiece.

One problem with these types of power chucks is that the actuator does not provide constant power to the rocker arms. Another problem is that only partial contact exists between the ball of the rocker arm and the swivel mounting, resulting in less accuracy in gripping the workpiece. Yet another problem is that the work engaging jaws cannot be removed quickly from the rocker arms.

SUMMARY OF THE INVENTION

It is, therefore, one object of the present invention to provide a power chuck with a substantially constant power ratio.

It is another object of the present invention to provide full contact between the ball of the rocker arm and the swivel mounting.

It is yet another object of the present invention to improve sealing of the power chuck.

It is a further object of the present invention to provide a quick change assembly for the jaws of the power chuck.

It is a still further object of the present invention to provide a new and improved power chuck.

To achieve the foregoing objects, the present invention is a power chuck including a body, a plurality of work engaging jaws, a plurality of rocker arms carrying the jaws, and a plurality of swivel mountings connecting the rocker arms to the body. The power chuck also includes a plurality of slide members connected to and matingly engaging the rocker arms and a reciprocable actuator disposed centrally of the rocker arms and operatively cooperating with the slide members. Reciprocatory movement of the actuator along the slide members rocks the rocker arms in the swivel mountings and moves the jaws radially relative to each other.

One advantage of the present invention is that a slide member is provided which generates substantially a constant power ratio to the rocker arms, resulting in less input and wear on the power chuck. Another advantage of the present invention is that full contact between the ball of the rocker arm and the swivel mounting is provided to improve accuracy of gripping. Yet another advantage is that the seal contacts the ball of the rocker ar directly, improving sealing of the power chuck. Still another advantage of the present invention is that it can be used for off/on-one chuck-two chucking modes for centralizing or compensating machining operations. A further advantage of the present invention is that a quick change jaw assembly is provided.

Other objects, features and advantages of the present invention will be readily appreciated as the sam becomes better understood after reading the following description in light of the accompanying drawings.

BRIEF DESCRIPTION OF THE DRAWINGS

FIG. 1 is a perspective view of a power chuck according to the present invention.

FIG. 5 is an exploded fragmentary elevational view of a quick-change jaw assembly for the power chuck of FIGS. 1 through 4.

FIG. 6 is a view similar to FIG. 5 illustrating the quick-change jaw assembly in an assembled position.

DESCRIPTION OF THE PREFERRED EMBODIMENT(S)

Figure 2:
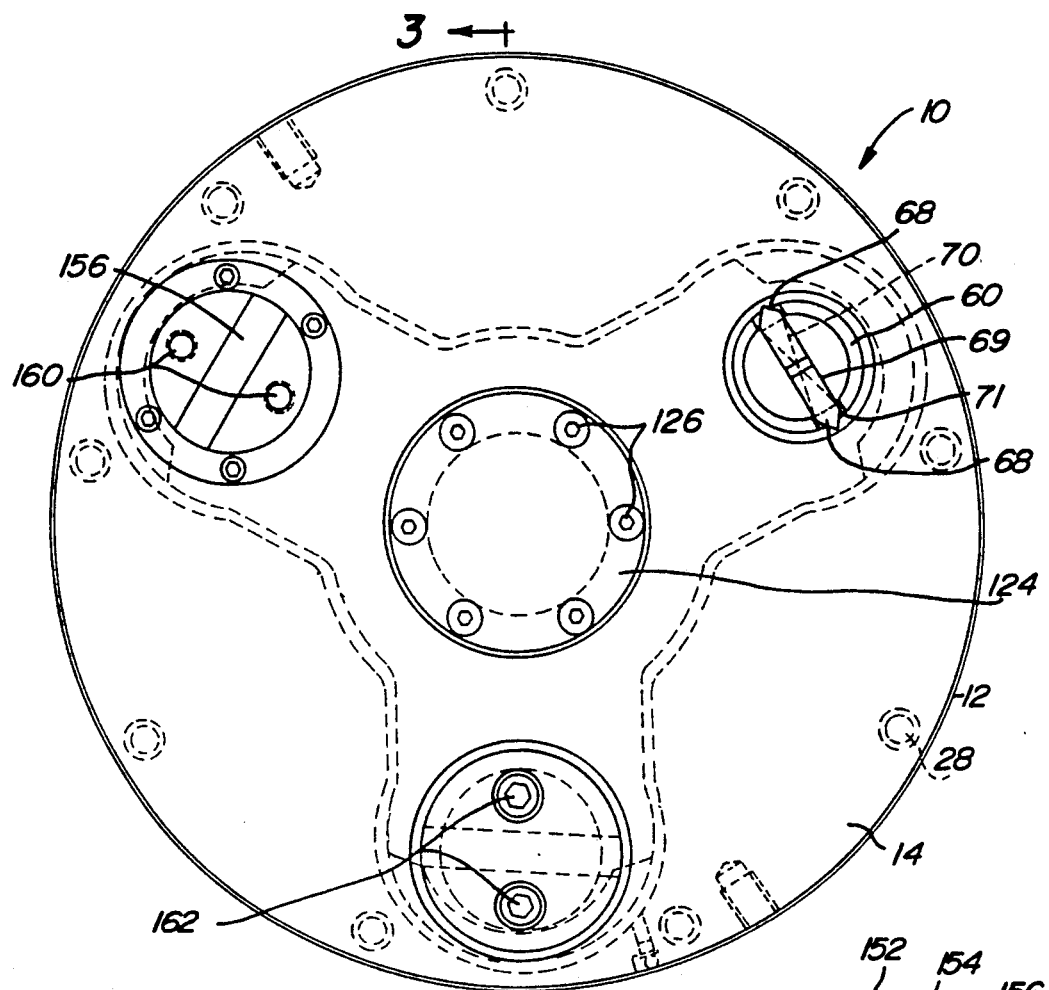
FIG. 2 is a plan view of the power chuck of FIG. 1 illustrating two jaws removed.
Figure 3:
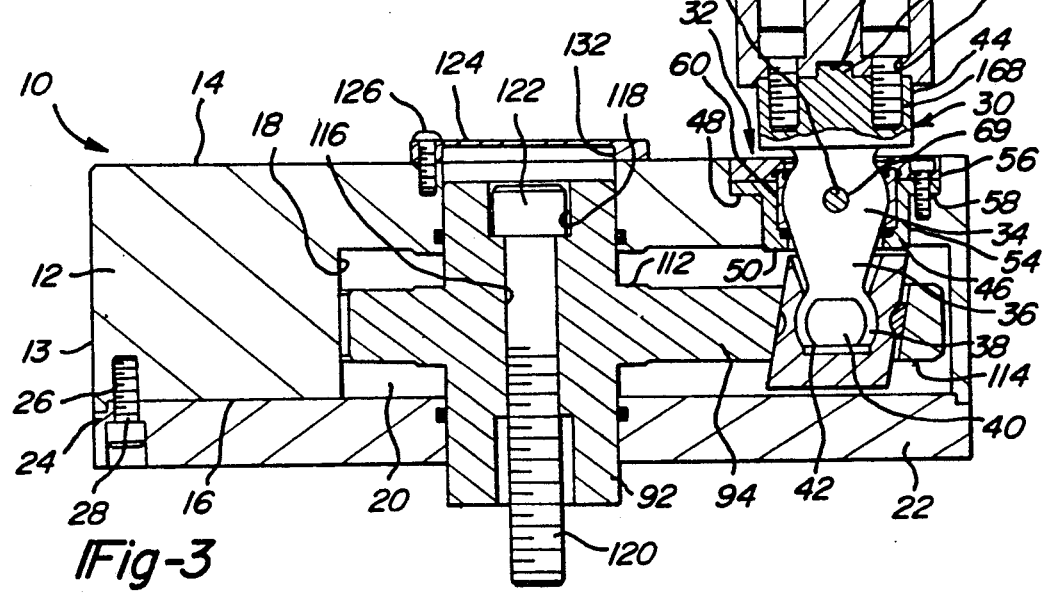
FIG. 3 is a sectional view taken along line 3—3 of FIG. 2.

Referring to FIGS. 1 through 4, a power chuck 10 according to the present invention is shown. The power chuck 10 includes a body 12 which is generally cylindrical in shape. The body 12 is made, preferably, of a metal material. The body 12 has a circular peripheral surface 13, radial front face 14, radial rear face 16 and a cavity 18 in the interior of the body 12 which is cored out or recessed to accommodate other parts of the power chuck 10. The cavity 18 has an opening 20 through the rear face 16.

The power chuck 10 also includes an adapter plate 22 which is partially recessed into the body 12 and closes the opening 20. The adapter plate 22 is generally cylindrical in shape and has a plurality of apertures 24 extending axially therethrough and adapted to match corresponding internally threaded apertures 26 in the body 12. Fasteners 28 such as screws extend through the apertures 24 and threadably engage the threaded apertures 26 to hold the adapter plate 22 fixedly but detachably fastened to the body 12. The heads of the screws 28 are countersunk into the adapter plate 22. It should be appreciated that the adapter plate 22 may be adapted for mounting on the front of a machine spindle (not shown). It should also be appreciated that the adapter plate 22 may be of any suitable shape or design to fit an particular machine or spindle and may vary from one machine to another.

The power chuck 10 includes a plurality of rocker arms, generally indicated at 30. In the preferred embodiment, three (3) rocker arms 30 are spaced equidistantly with respect to each other and from a central axis of the power chuck 10. The rocker arms 30 extend axially through the front face 14 of the body 12 and into the cavity 18. Each rocker arm 30 is attached to the body 12 by a swivel mounting, generally indicated at 32, to be described.

The rocker arm 30 has a ball portion 34 which is generally spherically shaped and a tapered portion 36 which tapers longitudinally to an end portion 38. The end portion 38 is generally spherically shaped with a pair of opposed flat or planar outer surfaces 40 and a flat or planar bottom surface 42. The rocker arm 30 also has a mounting portion 44 to be described extending longitudinally from the ball portion 34 forwardly of the front face 14 of the body 12.

The swivel mounting 32 includes a tubular mounting member 46 having a radial front flange 48 and a radial rear flange 50. The rear flange 50 terminates to form an opening 51 through which the rocker arm 30 extends and has a recessed portion 52. The mounting member 46 is disposed in a cavity 54 of the body 12. The cavity 54 has an enlarged opening 56 in the front face 14. The front flange 48 is adapted to abut a shoulder 58 forming the enlarged opening 56. It should be appreciated that the rocker arm 30 extends through the enlarged opening 56 and cavity 54.

The swivel mounting 32 also includes a tubular bearing member 60 disposed within the mounting member 46. The bearing member 60 has an arcuate interior surface 62 to matingly engage or contact the outer surface of the ball portion 34. The bearing member 60 has a seal 64 such as an O-ring disposed in a groove 66 near the front thereof. The seal 64 contacts directly the outer surface of the ball portion 34. The bearing member 60 is, preferably, a single fracture split member disposed about the ball portion 34 of the rocker arm 30. It should be appreciated that the outer surface of the ball portion 34 pivots o the interior surface 62 of the bearing member 60.

The swivel mounting 32 further includes a pair of pin members 68 extending through an aperture 69 in the ball portion 34. The swivel mounting 32 includes a homing spring 70 disposed within pockets of the pin members 68 to urge the pin members 68 in corresponding apertures 71 (FIG. 2) in the bearing member 60. The homing spring 70 allows the pin members 68 to move toward each other as the rocker arm 30 is rotated such that the pin members 68 disengage the apertures 71. The homing spring 70 also allows the pin members 68 to move away from each other to engage the apertures 71 when aligned therewith. It should be appreciated that the rocker arm 30 and pin members 68 rotate together.

The swivel mounting 32 includes at least one spring 72 disposed in the recessed portion 52 between the bearing member 60 and the rear flange 50. The spring 72 is preferably a pulldown or wave spring although any suitable spring may be used. The spring 72 provides resiliency to control pull back of the rocker arm 30 during chucking and to push forward the rocker arms 30 during unchucking. It should be appreciated that during chucking the rocker arms 30 pull down or move back toward the adapter plate 22 a predetermined distance such as 0.030 inches.

The swivel mounting 32 also includes an annular ring member 74 disposed in the enlarged opening 56 and having an aperture 76 extending therethrough. The ring member 74 has a shoulder 78 to engage the bearing member 60 and prevent the bearing member 60 from exiting the mounting member 46. The ring member 74 has a seal 80 such as an O-ring disposed in a groove 82 between the ring member 74 and bearing member 60. Fasteners 84 such as screws extend through apertures 85 and 86 in the ring member 74 and mounting member 46, respectively, to threadably engage corresponding internally threaded apertures 88 to hold the ring member 74 fixedly but detachably fastened to the body 12.

The power chuck 10 includes an actuator, generally indicated at 90, to pivot or rock the rocker arm 30. The actuator 90 has a journal 92 and a plurality of arm or lobe portions 94 extending radially from the journal 92. Preferably, three lobe portions 94 are equally circumferentially spaced about the journal 92 and have an aperture 96 extending through near the radial free end thereof. The aperture 96 is inclined radially outwardly. Preferably, the angle of incline is ten degrees (10°). It should be appreciated that one of the lobe portions 94 engages or contacts a corresponding portion of the cavity 18 to prevent rotation of the actuator 90 in the cavity 18.

The journal 92 is disposed and slidably received in apertures 100 and 102 provided centrally in the front face 14 of the body 12 and in the adapter plate 22, respectively. A seal 104 such as an O-ring is disposed in a groove 106 about the opening 108 and a seal 108 such as an O-ring is disposed in a groove 110 about the opening 102 in the adapter plate 22 to directly contact the journal 92. The actuator 90 is guided for reciprocatory travel in both directions by the apertures 100 and 102 and is limited by front and rear abutments 112 and 114 on the lobe portions 94. It will be appreciated that the front abutment 112 seats against the bottom of the aperture 100 when the actuator 90 is at the forward limit of its travel illustrated in phantom lines and that the rear abutment 114 seats against the adapter plate 22 when the actuator 90 is at the rearward limit of its travel illustrated by solid lines in FIG. 4. It should be appreciated that the rear abutment 114 may not seat against the adapter plate 22 when a workpiece is disposed in the power chuck 10.

The actuator 90 includes an aperture 116 extending axially through the journal 92 and having a countersink 118 at the forward end thereof to accept a machine screw 120 having a head 122 disposed in the countersink 122. It should be appreciated that the machine screw 120 connects the actuator 90 to a drawbar (not shown) disposed within the spindle. It should also be appreciated that suitable breather vents (not shown) are provided to prevent build up of pressure forward of the journal 92.

The power chuck 10 further includes a cap 124 mounted centrally about the opening 100 in the front face 14 of the body 12. The cap 124 is fixedly but detachably fastened to the body 12 by fasteners 126 such as screws. The fasteners 126 extend through apertures 128 in the cap 124 and threadably engage corresponding internally threaded apertures 130 in the body 12 such that the cap 124 covers the aperture 100 and protects the journal 92. The cap 124 may be formed with an internal pocket or recess 132 which coincides with the aperture 100 and progressively receives the journal 92 as the actuator 90 moves forwardly to the forward limit of its travel. It should be appreciated that the journal 92 extends entirely through the adapter plate 22 and into the spindle for convenient attachment to the drawbar. It should also be appreciated that although the actuator 90 is intended for attachment to a mechanical drive such as the drawbar of a machine tool, it can easily be adapted for hydraulic or pneumatic operation.

The power chuck 10 also includes a power cylinder or slide member 134 connected to each of the rocker arms 30. The slide member 134 is generally cylindrical in shape. The slide member 134 is inclined and adapted to mate with the incline of the aperture 96. The slide member 134 has a cavity 136 with an enlarged tapered opening 138 at a front end thereof. The cavity 136 has an arcuate interior surface 140 having a planar or flat side surfaces (not shown). The end portion 38 is inserted into the cavity 136 of the slide member 134 and rotated such that the arcuate outer surface of the end portion 38 is matingly engages or contacts the interior surface 140 of the cavity 136. The slide member 134 also has a groove or key way 144 circumferentially about the outer periphery thereof which is generally arcuate in shape. A key 146 has an arcuate portion 148 disposed in the key way 144 and extending partially circumferentially therealong. The key 146 also has a planar portion 150 which abuts the surface of the opening 96. The key 146 prevents the slide member 134 from rotating and disengaging the end portion 38 of the rocker arm 30. It should be appreciated that the end portion 38 rotates along the interior surface 140 of the slide member 134.

The power chuck 10 further includes a work engaging jaw 152 for each rocker arm 30. The jaw 152 may be cylindrical or rectangular in shape. The jaw 152 is mounted on the mounting portion 44 of the rocker arm 30. The jaw 152 may include a key way 154 on a bottom or rear surface thereof adapted to receive a corresponding key 156 extending axially from a front or top surface of the mounting portion 44. In the preferred embodiment, the key way 154 and key 156 are generally rectangular in shape. The jaw 152 has at least one, preferably a plurality of apertures 158 extending axially therethrough and adapted to match corresponding threaded apertures 160 in the mounting portion 44. Fasteners 162 such as screws extend through the apertures 158 and threadably engage the threaded apertures 160 to hold the jaw 152 fixedly but detachably fastened to the rocker arm 30. The heads of the screws are countersunk in the jaw 152 so not to interfere with the workpiece. As illustrated in FIG. 1, the jaws 152 may have a portion removed, the shape of which may be varied depending on the shape of the workpiece.

Figure 4:
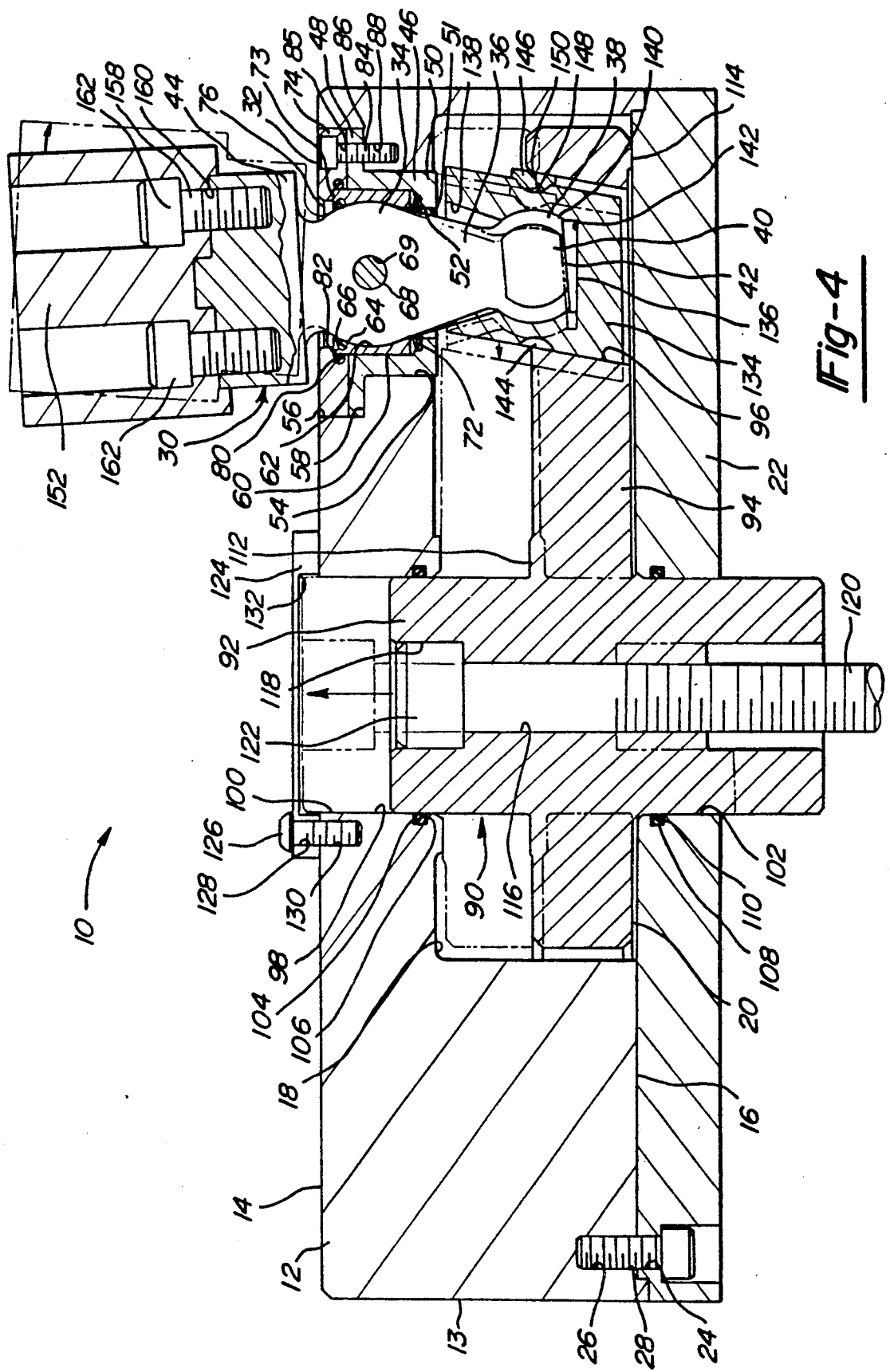
FIG. 4 is an enlarged view of FIG. 3 illustrating the power chuck in an open and closed jaw position.

In operation, the power chuck 10 has a first and second operable position as illustrated in FIG. 4. In phantom lines, the actuator 90 is in an open or unlocked position and the front abutment 112 on the lobe portions 94 contact the bottom of the aperture 100. The workpiece is loaded on the front face 14 of the power chuck 10. The actuator 90 is moved by the drawbar axially toward the adapter plate 22. As this occurs, the inclined surfaces of the aperture 96 travel along the slide member 134 and key 146 to move the slide member 134 radially outwardly. The radial outward movement of the slide member 134 pivots or rotates the end portion 38, in turn, pivoting the rocker arm 30 radially inwardly such that the jaw 152 engages the workpiece. In solid lines, the actuator 90 is in a closed or locked position and the rear abutment 114 on the lobe portions 94 contact the adapter plate 22. The operation is reversed to disengage the workpiece.

Referring to FIGS. 5 and 6, a quick-change jaw assembly 164 according to the present invention is shown. The assembly 164 includes an aperture 166 extending on an incline through the mounting portion 44 of the rocker arm 30. The mounting portion 44 may also have an inclined surface 168 at one radial end. The jaw 152 has a pocket 170 extending on an incline substantially perpendicular to the incline of aperture 166. The jaw 152 has an axially extending lip 172 with an inclined surface 174 adapted to mate with the inclined surface 168 of the mounting portion 44. The assembly 164 includes a connector 176 having a first portion 178 and a second portion 180 substantially perpendicular to the first portion 178 to form a general "T" shape. The first portion 178 includes a threaded aperture 182 extending therethrough. The assembly 164 includes a fastener 184 having a radial flange 186. The fastener 184 threadably engages the threaded aperture 182 and the flange 186 engages a groove 188 in the mounting portion 44 to prevent the fastener 184 from exiting the aperture 166.

In operation, the first portion 178 of the connector 176 is disposed in the aperture 166 and the second portion 180 extends outwardly of the mounting portion 44. The fastener 184 engages the threaded aperture 182 and the flange 186 is disposed in the groove 188. The jaw 152 is moved toward the mounting portion 44 such that the second portion 180 is received in the pocket 170. As the fastener 184 is rotated, the jaw 152 moves radially such that the inclined surface 174 engages and disengages the inclined surface 168 in a locked and unlocked position shown in solid and phantom lines in FIG. 6, respectively.

Accordingly, the power chuck 10 is provided in various sizes, six inch, eight inch, etc. The power chuck 10 may provide external and internal chucking with centralizing, compensating or off-on. The power chuck 10 provides first and second chucking, ball joint construction, high power ratio, positive gripping force, increased jaw travel, sealed design, pullback action, built-in jaw swivel, and standard or quick-change jaws.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A power chuck, comprising:
    a body;
    a plurality of work engaging jaws;
    a plurality of rocker arms carrying said jaws, said rocker arms extending axially along an axis, said rocker arms having a mounting portion at one axial end for said jaws and an end portion at the other axial end;
    a plurality of swivel mountings connecting said rocker arms to said body;
    a plurality of slide members receiving said end portions of said rocker arms; and
    a reciprocable actuator disposed centrally of said rocker arms and operatively cooperating with said slide members;
    whereby reciprocatory movement of the actuator along the slide members rocks the rocker arms in the swivel mountings and moves the jaws radially relative to each other.

2. A power chuck as set forth in claim 1 wherein said slide member has an inclined outer surface.

3. A power chuck as set forth in claim 2 wherein said actuator include means forming an aperture extending therethrough for each of said slide members.

4. A power chuck as set forth in claim 3 wherein said aperture is inclined, said aperture receiving said slide member.

5. A power chuck, comprising:
    a body;
    a plurality of work engaging jaws;
    a plurality of rocker arms carrying said jaws;
    a plurality of swivel mountings connecting said rocker arms to said body;
    a plurality of slide members connected to and matingly engaging said rocker arms; and a reciprocable actuator disposed centrally of said rocker arms and operatively cooperating with said slide members, whereby reciprocatory movement of the actuator along the slide members rocks the rocker arms in the swivel mountings and moves the jaws radially relative to each other;

said rocker arms extending axially along an axis, said rocker arms having a mounting portion at one axial end for said jaws, an end portion at the other axial end, and a ball portion disposed between said mounting portion and said end portion;

wherein said slide member includes means forming a cavity with an opening at one axial end to receive said end portion.

6. A power chuck as set forth in claim 5 wherein said end portion has an arcuate shaped outer surface and a pair of opposed flats.

7. A power chuck as set forth in claim 6 wherein said slide member includes an arcuate shaped interior surface forming a portion of said cavity.

8. A power chuck as set forth in claim 7 wherein said slide member includes a pair of planar shaped interior surfaces forming a portion of said cavity.

9. A power chuck as set forth in claim 5 wherein said slide member includes means forming a groove circumferentially about a periphery of said slide member.

10. A power chuck as set forth in claim 5 including means for resisting rotation between said slide member and said end portion.

11. A power chuck as set forth in claim 10 including a key disposed in said groove to prevent said slide member from disengaging said end portion of said rocker arm.

12. A power chuck as set forth in claim 5 including a bearing member disposed about said ball portion.

13. A power chuck as set forth in claim 12 wherein said swivel mounting includes means for urging said bearing member axially outwardly.

14. A power chuck as set forth in claim 13 wherein said urging means comprises a spring disposed between said bearing member and said body.

15. A power chuck as set forth in claim 14 including means for quickly changing said jaws.

16. A power chuck, comprising:
a body;
a plurality of work engaging jaws;
a plurality of rocker arms carrying said jaws;
a plurality of swivel mountings connecting said rocker arms to said body;
a plurality of slide members connected to said rocker arms;
a reciprocable actuator disposed centrally of said rocker arms and operatively cooperating with said slide members;
each of said rocker arms extending axially along an axis and having a mounting portion at one axial end, an end portion at the other axial end, and a ball portion disposed between said mounting portion and said end portion, said end portion having an arcuate shaped outer surface;
each of said slide members including means forming a cavity with an opening at one axial end and an arcuate shaped interior surface forming a portion of said cavity, said slide member having an inclined outer surface;
said actuator including forming apertures extending therethrough for each of said slide members and being inclined said apertures receiving said slide members, whereby reciprocatory movement of the actuator along the slide members rocks the rocker arms in the swivel mountings and moves the jaws radially relative to each other.

17. A power chuck as set forth in claim 16 wherein said slide member includes means forming a groove circumferentially about a periphery of said slide member.

18. A power chuck as set forth in claim 17 including means disposed in said groove to prevent said slide member from disengaging said end portion.

19. A power chuck, comprising:
a body;
a plurality of work engaging jaws;
a plurality of rocker arms carrying said jaws;
a plurality of swivel mountings connecting said rocker arms to said body;
a plurality of slide members connected to said rocker arms, each of said slide members having an inclined outer surface;
a reciprocable actuator disposed centrally of said rocker arms and operatively cooperating with said slide members, said actuator including means forming apertures extending therethrough for each of said slide members;
whereby reciprocatory movement of the actuator along the slide members rocks the rocker arms in the swivel mountings and move the jaws radially relative to each other;
each of said rocker arms extending along an axial axis and having a mounting portion at one axial end, an end portion at the other axial end, and a ball portion disposed between said mounting portion and said end portion, said end portion has a arcuate shaped outer surface;
each of said slide members including means forming a cavity with an opening at one axial end and an arcuate shaped interior surface forming a portion of said cavity;
each of said slide members including means forming a pair of planar surfaces forming a portion of said cavity to allow said end portion to be disposed in said cavity and including means forming a groove circumferentially about a periphery of each of said slide members;
a key disposed in said groove to prevent said slide member from disengaging said end portion;
a bearing member disposed about said ball portion; and
a spring disposed between said bearing member and said body for urging said bearing member axially outwardly.

20. A power chuck, comprising:
a body;
a plurality of work engaging jaws;
a plurality of rocker arms carrying said jaws;
a plurality of swivel mountings connecting said rocker arms to said body;
a plurality of slide members connected to and matingly engaging said rocker arms;
a reciprocable actuator disposed centrally of said rocker arms and operatively cooperating with said slide members, whereby reciprocatory movement of the actuator along the slide members rocks the rocker arms in the swivel mountings and moves the jaws radially relative to each other;
said rocker arms extending axially along an axis, said rocker arms having a mounting portion at one axial end for said jaws and an end portion at the other axial end;

said slide member including means forming a cavity with an opening at one axial end to receive said end portion; and means for resisting rotation between said slide member and said end portion.

* * * * *

(12) EX PARTE REEXAMINATION CERTIFICATE (5088th)
United States Patent
Cross et al.

(10) Number: US 5,184,833 C1
(45) Certificate Issued: Mar. 22, 2005

(54) POWER CHUCK

(75) Inventors: Kenneth Cross, Utica, MI (US); Ralph J. Gonnocci, Rochester Hills, MI (US)

(73) Assignee: Ralph J. Gonnocci Revocable Living Trust, Rochester, MI (US)

Reexamination Request:
No. 90/006,767, Aug. 29, 2003

Reexamination Certificate for:
Patent No.: 5,184,833
Issued: Feb. 9, 1993
Appl. No.: 07/816,175
Filed: Jan. 2, 1992

(51) Int. Cl.$^7$ .............................................. B23B 31/175
(52) U.S. Cl. ........................ 279/106; 279/119; 279/121; 279/124; 279/132
(58) Field of Search .................................. 279/106, 107, 279/108, 109, 118, 119, 120, 121, 157, 123, 124, 132

(56) References Cited

U.S. PATENT DOCUMENTS

| | | |
|---|---|---|
| 2,613,943 A | 10/1952 | Trudeau |
| 2,698,185 A | 12/1954 | Sloan |
| 2,703,242 A | 3/1955 | Sloan et al. |
| 2,722,427 A | 11/1955 | Labeyrie |
| 3,099,457 A | 7/1963 | Hohwart et al. |
| 3,104,886 A | 9/1963 | Hohwart et al. |
| 3,365,206 A | 1/1968 | Hohwart et al. |
| 3,380,747 A | 4/1968 | Hohwart et al. |
| 3,423,098 A | 1/1969 | Hohwart et al. |
| 3,472,526 A | 10/1969 | Hohwart et al. |
| 3,604,717 A | 9/1971 | Hohwart |
| 3,630,535 A | 12/1971 | Renoux |
| 4,009,888 A | 3/1977 | Wallace |
| 4,410,192 A * | 10/1983 | Nobukawa et al. ......... 279/121 |
| 4,465,289 A | 8/1984 | Banks |
| 4,569,530 A | 2/1986 | Cross |
| 4,647,051 A | 3/1987 | Stone et al. |
| 4,667,970 A | 5/1987 | Pruden |
| 5,052,700 A | 10/1991 | Howard et al. |
| 5,060,957 A | 10/1991 | Stolzenberg et al. |
| 5,135,242 A | 8/1992 | Toth |
| 5,184,833 A | 2/1993 | Cross et al. |

FOREIGN PATENT DOCUMENTS

| | | |
|---|---|---|
| DE | 2060057 | 9/1971 |
| FR | 65732 | 3/1956 |
| JP | 01306106 A | 12/1989 |
| RU | 396192 | 3/1974 |

* cited by examiner

Primary Examiner—Daniel W. Howell

(57) ABSTRACT

A power chuck includes a body, a plurality of work engaging jaws, a plurality of rocker arms carrying the jaws, and a plurality of swivel mountings connecting the rocker arms to the body. The power chuck also includes a plurality of slide members connected to and matingly engaging the rocker arms and a reciprocable actuator disposed centrally of the rocker arms and operatively cooperating with the slide members. Reciprocatory movement of the actuator along the slide members rocks the rocker arms in the swivel mountings and moves the jaws radially relative to each other.

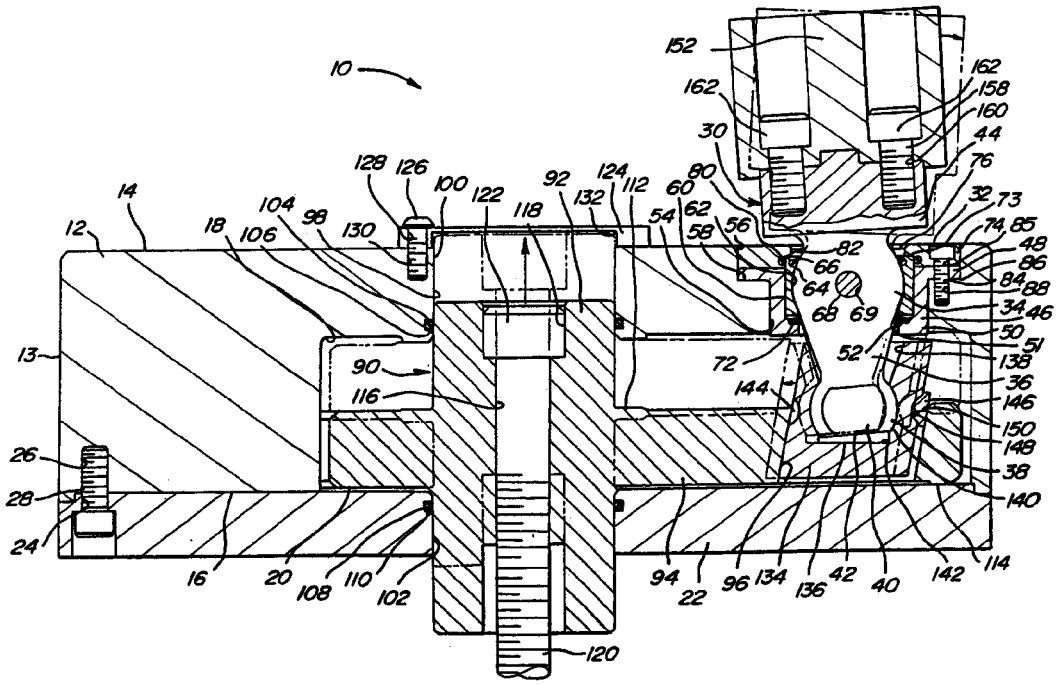

US 5,184,833 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 19 is confirmed.

Claims 1, 5, 8, 9, 11, 13, 16, 17 and 20 are determined to be patentable as amended.

Claims 2–4, 6, 7, 10, 12, 14, 15 and 18, dependent on an amended claim, are determined to be patentable.

1. A power chuck, comprising:
a body;
a plurality of work engaging jaws;
a plurality of rocker arms carrying said jaws, said rocker arms extending axially along an axis, said rocker arms having a mounting portion at one axial end for said jaws and an end portion at the other axial end;
a plurality of swivel mountings connecting said rocker arms to said body, *each of said swivel mountings having an arcuate interior surface to matingly engage an arcuate outer surface of a corresponding one of said rocker arms*;
a plurality of slide members receiving said end portions of said rocker arms; and
a reciprocable actuator disposed centrally of said rocker arms [and operatively cooperating with], *said actuator radially enclosing said slide members and being movable axially to travel axially along* said slide members;
whereby reciprocatory movement of the actuator *axially along* the slide members rocks the rocker arms in the swivel mountings and moves the jaws radially relative to each other.

5. A power chuck, comprising:
a body;
a plurality of work engaging jaws;
a plurality of rocker arms carrying said jaws;
a plurality of swivel mountings connecting said rocker arms to said body;
a plurality of slide members connected to and matingly engaging said rocker arms; and
a reciprocable actuator disposed centrally of said rocker arms [and operatively cooperating with], *said actuator radially enclosing said slide members and being movable axially to travel axially along* said slide members, whereby reciprocatory movement of the actuator *axially* along the slide members rocks the rocker arms in the swivel mountings and moves the jaws radially relative to each other;
said rocker arms extending axially along an axis, said rocker arms having a mounting portion at one axial end for said jaws, an end portion at the other axial end, and a ball portion disposed between said mounting portion and said end portion;
each of said swivel mountings having an arcuate interior surface to matingly engage an outer surface of said ball portion of a corresponding one of said rockers arms; and
wherein said slide member includes means forming a cavity with an opening at one axial end to receive said end portion.

8. A power chuck [as set forth in claim 7] *comprising:*
*a body;*
*a plurality of work engaging jaws;*
*a plurality of rocker arms carrying said jaws;*
*a plurality of swivel mountings connecting said rocker arms to said body;*
*a plurality of slide members connected to and matingly engaging said rocker arms;*
*a reciprocable actuator disposed centrally of said rocker arms and operatively cooperating with said slide members, whereby reciprocatory movement of the actuator along the slide members rocks the rocker arms in the swivel mountings and moves the jaws radially relative to each other;*
*said rocker arms extending axially along an axis, said rocker arms having a mounting portion at one axial end for said jaws, an end portion at the other axial end, and a ball portion disposed between said mounting portion and said end portion;*
*wherein said slide member includes means forming a cavity with an opening at one axial end to receive said end portion;*
wherein said end portion has an arcuate shaped outer surface and a pair of opposed flats;
wherein said slide member includes an arcuate shaped interior surface forming a portion of said cavity; and
wherein said slide member includes a pair of planar shaped interior surfaces forming a portion of said cavity.

9. A power chuck [as set forth in claim 5] *comprising:*
*a body;*
*a plurality of work engaging jaws;*
*a plurality of rocker arms carrying said jaws;*
*a plurality of swivel mountings connecting said rocker arms to said body;*
*a plurality of slide members connected to and matingly engaging said rocker arms;*
*a reciprocable actuator disposed centrally of said rocker arms and operatively cooperating with said slide members, whereby reciprocatory movement of the actuator along the slide members rocks the rocker arms in the swivel mountings and moves the jaws radially relative to each other;*
*said rocker arms extending axially along an axis, said rocker arms having a mounting portion at one axial end for said jaws, an end portion at the other axial end, and a ball portion disposed between said mounting portion and said end portion;*
*wherein said slide member includes means forming a cavity with an opening at one axial end to receive said end portion; and*
wherein said slide member includes means forming a groove circumferentially about a periphery of said slide member.

11. A power chuck as set forth in claim [10] *9* including a key disposed in said groove to prevent said slide member from disengaging said end portion of said rocker arm.

13. A power chuck [as set forth in claim 12] *comprising:*

*a body;*

*a plurality of work engaging jaws;*

*a plurality of rocker arms carrying said jaws;*

*a plurality of swivel mountings connecting said rocker arms to said body;*

*a plurality of slide members connected to and matingly engaging said rocker arms;*

*a reciprocable actuator disposed centrally of said rocker arms and operatively cooperating with said slide members, whereby reciprocatory movement of the actuator along the slide members rocks the rocker arms in the swivel mountings and moves the jaws radially relative to each other;*

*said rocker arms extending axially along an axis, said rocker arms having a mounting portion at one axial end for said jaws, and end portion at the other axial end, and a ball portion disposed between said mounting portion and said end portion;*

*wherein said slide member includes means forming a cavity with an opening at one axial end to receive said end portion;*

*a bearing member disposed about said ball portion; and* wherein said swivel mounting includes means for urging said bearing member axially outwardly.

16. A power chuck, comprising:

a body;

a plurality of work engaging jaws;

a plurality of rocker arms carrying said jaws;

a plurality of swivel mountings connecting said rocker arms to said body;

a plurality of slide members connected to said rocker arms;

a reciprocable actuator disposed centrally of said rocker arms and operatively cooperating with said slide members;

each of said rocker arms extending axially along an axis and having a mounting portion at one axial end, an end portion at the other axial end, and a ball portion disposed between said mounting portion and said end portion, said end portion having an arcuate shaped outer surface;

*each of said swivel mountings having an arcuate interior surface to matingly engage an outer surface of said ball portion of a corresponding one of said rocker arms;* each of said slide members including means forming a cavity with an opening at one axial end and an arcuate shaped interior surface forming a portion of said cavity, said slide member having an inclined outer surface;

said actuator *being movable axially and* including forming apertures extending therethrough for *receiving and radially enclosing* each of said slide members and being inclined [said apertures receiving] *to travel axially along* said slide members, whereby reciprocatory movement of the actuator *axially* along the slide members rocks the rocker arms in the swivel mountings and moves the jaws radially relative to each other.

17. A power chuck [as set forth in claim 16] *comprising:*

*a body;*

*a plurality of work engaging jaws;*

*a plurality of rocker arms carrying said jaws;*

*a plurality of swivel mountings connecting said rocker arms to said body;*

*a plurality of slide members connected to said rocker arms;*

*a reciprocable actuator disposed centrally of said rocker arms and operatively cooperating with said slide members;*

*each of said rocker arms extending axially along an axis and having a mounting portion at one axial end, an end portion at the other axial end, and a ball portion disposed between said mounting portion and said end portion, said end portion having an arcuate shaped outer surface;*

*each of said slide members including means forming a cavity with an opening at one axial end and an arcuate shaped interior surface forming a portion of said cavity, said slide member having an inclined outer surface;*

*said actuator including forming apertures extending therethrough for each of said slide members and being inclined said apertures receiving said slide members, whereby reciprocatory movement of the actuator along the slide members rocks the rocker arms in the swivel mountings and moves the jaws radially relative to each other; and* wherein said slide member includes means forming a groove circumferentially about a periphery of said slide member.

20. A power chuck, comprising:

a body;

a plurality of work engaging jaws;

a plurality of rocker arms carrying said jaws;

a plurality of swivel mountings connecting said rocker arms to said body*, each of said swivel mountings having an arcuate interior surface to matingly engage an arcuate outer surface of a corresponding one of said rocker arms*;

a plurality of slide members connected to and matingly engaging said rocker arms;

a reciprocable actuator disposed centrally of said rocker arms [and operatively cooperating with], *said actuator radially enclosing said slide embers and being movable axially to travel axially along* said slide members, whereby reciprocatory movement of the actuator *axially* along the slide members rocks the rocker arms in the swivel mountings and moves the jaws radially relative to each other;

said rocker arms extending axially along an axis, said rocker arms having a mounting portion at one axial end for said jaws and an end portion at the other axial end;

said slide member including means forming a cavity with an opening at one axial end to receive said end portion; and means for resisting rotation between said slide member and said end portion.

* * * * *